(12) United States Patent
Yamazaki

(10) Patent No.: US 6,552,980 B2
(45) Date of Patent: Apr. 22, 2003

(54) METHOD OF SETTING POWER FOR A REPRODUCING BEAM TO BE APPLIED TO A MAGNETO-OPTICAL DISC, AND METHOD OF REPRODUCING DATA FROM A MAGNETO-OPTICAL DISC

(75) Inventor: Kenji Yamazaki, Tokyo (JP)

(73) Assignee: Sony Corporation, Tokyo (JP)

(*) Notice: Subject to any disclaimer, the term of this patent is extended or adjusted under 35 U.S.C. 154(b) by 43 days.

(21) Appl. No.: 09/893,927

(22) Filed: Jun. 28, 2001

(65) Prior Publication Data
US 2002/0001269 A1 Jan. 3, 2002

(30) Foreign Application Priority Data
Jun. 29, 2000 (JP) ........................................ 2000-197407

(51) Int. Cl.[7] ................................................ G11B 7/00
(52) U.S. Cl. ...................... 369/47.5; 369/53.1; 369/47.1
(58) Field of Search ............................ 369/47.1, 47.49, 369/47.5, 47.51, 47.52, 47.53, 53.1, 53.11, 59.1, 59.11, 116

(56) References Cited

U.S. PATENT DOCUMENTS 5,548,572 A * 8/1996 Kulakowski et al. ..... 369/47.52
6,246,660 B1 * 6/2001 Yanagawa ................... 369/116

* cited by examiner

Primary Examiner—Muhammad Edun
(74) Attorney, Agent, or Firm—Frommer Lawrence & Haug LLP; William S. Frommer (57) ABSTRACT

An object of the invention is to provide a method of setting power for a reproducing beam applied to a rotating magneto-optical disc to reproduce data signals therefrom in the magnetically induced super resolution (MSR) mode, thereby to heat the signal-recording layer of the disc sufficiently even if the disc warps and to attain an adequate MSR effect. Another object of the invention is to provide a method of reproducing data from such a magneto-optical disc. To set power for the reproducing laser beam, calibration is carried out for at least two points on the radius of the magneto-optical disc, and optimal powers for these points are calculated. From the optimal powers, the power for the reproducing beam is calculated by curvilinear approximation and set for a given position on the magneto-optical disc. The margin of power for the reproducing beam can be thereby increased. Data can therefore be reliably reproduced in the MSR mode from the magneto-optical disc that has a signal-recording layer whose magnetic characteristic greatly depends on temperature.

8 Claims, 7 Drawing Sheets

POSITION ON THE RADIUS OF DISC

FIG.11

METHOD OF SETTING POWER FOR A REPRODUCING BEAM TO BE APPLIED TO A MAGNETO-OPTICAL DISC, AND METHOD OF REPRODUCING DATA FROM A MAGNETO-OPTICAL DISC

BACKGROUND OF THE INVENTION

1. Field of the Invention

The present invention relates to a method of setting power for a reproducing beam to be applied to a magneto-optical disc at a constant angular velocity to reproduce data signals therefrom in the magnetically induced super resolution mode. The invention also relates to a method of reproducing data signals from a magneto-optical disc by applying a beam of the power thus set, to the magneto-optical disc.

2. Related Art

Magneto-optical discs are known as recording media on which data signals can be rewritten. A magneto-optical disc comprises a substrate and a signal-recording layer provided on the substrate. The signal-recording layer has recording tracks on its surface. A recording beam may be applied to the signal-recording layer while the magneto-optical disc is rotating, thereby to record data signals along the recording tracks. A reproducing beam may be applied to the signal-recording layer while the magneto-optical disc is rotating, thereby to reproduce data signals from the recording tracks. Data can be recorded on the magneto-optical disc in two modes, which are known as "light modulation mode" and "magnetic-field modulation mode," respectively.

In the light modulation mode, an external magnetic field generated from a prescribed bias is applied to the signal-recording layer that has been magnetized in a predetermined direction. A laser beam modulated in accordance with a data signal to be recorded is applied to the signal-recording layer thus magnetized. Record marks are thereby formed on those parts of the signal-recording layer which have been irradiated with the laser beam, whereby data is recorded on the magneto-optical disc. Note that the record marks are magnetized in the direction of the external magnetic field.

To reproduce data from a magneto-optical disc, a laser beam less intense than the beam applied to record the data on the disc is applied to the recording track of the disc, and the bean reflected from the signal-recording layer of the disc is detected. The plane of polarization of the laser beam rotates in the signal-recording layer by virtue of the so-called magnetic Kerr effect. Hence, any record mark on the disc is detected from the difference in intensity between the beam reflected from the record mark and the beam reflected from any other part of the signal-recording layer. The data is thereby reproduced from the magneto-optical disc.

In recent years, it has been increasingly demanded that recording media be smaller and store more data. Recording density should therefore be increased in magneto-optical discs, too. With the conventional magneto-optical disc it is easy to form smaller record marks by controlling the intensity of the laser beam. It is difficult, however, to detect small record marks at high S/N ratio.

To overcome the limitation to the data reproduction from the conventional magneto-optical disc, it is proposed that data be recorded and reproduced by means of the technique called "magnetically induced super resolution (MSR)." This technique uses a magneto-optical disc with a signal-recording layer composed of a plurality of magnetic layers the magnetic characteristic of which changes with temperature. With the disc of this type it is possible to reproduce data from record marks that are smaller than the spot the laser beam forms on the signal-recording layer 2. Various proposals have been proposed about the multi-layer structure of the signal-recording layer and the method of reproducing data from record marks.

In the case of the conventional 5.25-inch magneto-optical disc, the user area, in and from which data signals are recorded and reproduced, is a region that has inner and outer diameters of 30 mm and 60 mm, respectively. The 5.25-inch magneto-optical disc is rotated at a constant angular velocity (CAV) in the process of recording or reproducing data. Thus, the linear velocity at the outermost track of the user area is 2½ times, or about 1.4 times, as high as that at the innermost track.

While the magneto-optical disc is rotating in the process of recording data on it or reproducing data from it, it is supported at its center in the magneto-optical disc drive. Thus supported, the disc may warp due to its own weight, assuming a shape like a bowl.

To reproduce data from the magneto-optical disc by means of magnetically induced super resolution, it is necessary to control the intensity of the laser beam at high precision to attain the MSR effect as is desired. This is because the magnetic characteristic of the signal-recording layer greatly depends on temperature as has been mentioned above. In particular, the intensity of the beam must be increased with high precision to reproduce data while rotating the disc at a constant angular velocity. Since the linear velocity is higher at any track than at an inner track, the beam applied to a track should be more intense than the one applied to any inner track.

Therefore, the intensity of the reproducing beam is linearly increased as the beam spot moves from the innermost track to the outermost track in the user area of the magneto-optical disc. The beam applied to the outermost track is, for example, 2½ times as high as the bean applied to the innermost track.

However, the magneto-optical disc warps in the process of reproducing data from it, as has been described above. The disc inclines more at a track than at any inner track. Namely, the signal-recording layer inclines to the laser beam applied to the disc, at an increasing angle toward the outermost recording track. The spot the laser beam forms on the signal-recording layer inevitably has coma-aberration. Moreover, the beam spot is de-focused. Consequently, no sufficient temperature rise can take place at that part of the signal-recording layer which is irradiated with the laser beam. This makes it impossible to attain high or stable MSR effect.

BRIEF SUMMARY OF THE INVENTION

Accordingly, an object of the present invention is to provide a method of setting intensity for a reproducing beam applied to a rotating magneto-optical disc to reproduce data therefrom by means of the MSR technique, thereby to heat the signal-recording layer of the disc sufficiently even if the disc warps and attain an adequate MSR effect. Another object of the invention is to provide a method of reproducing data from a magneto-optical disc by applying a beam of the intensity thus set, to the magneto-optical disc.

According to the invention, there is provided a method of setting power for a reproducing beam to be applied to a magneto-optical disc to reproduce data signals therefrom in magnetically induced super resolution mode, while the disc is rotating at a constant angular velocity. The method comprises: a first calibration step of performing calibration on a signal-recording region of the magneto-optical disc, at least two positions on a radius of the magneto-optical disc, thereby to calculate optimal data-reproducing powers for said at least two positions; and a second calibration step of setting a data-reproducing power optimal for a given position on the radius of the magneto-optical disc, by performing curvilinear approximation on the data-reproducing powers calculated in the first calibration step.

According to the invention, there is provided a method of reproducing data signals from a magneto-optical disc, while the disc is rotating at a constant angular velocity. The method comprises: a first calibration step of performing calibration on a signal-recording region of the magneto-optical disc, at at least two positions on a radius of the magneto-optical disc, thereby to calculate optimal data-reproducing powers for said at least two positions; a second calibration step of setting a data-reproducing power optimal for a given position on the radius of the magneto-optical disc, by performing curvilinear approximation on the data-reproducing powers calculated in the first calibration step; and a data-reproducing step of applying a laser beam to the magneto-optical disc, thereby to reproduce data signals from the disc, said laser beam having intensity that corresponds to the data-reproducing power set in the second calibration step.

In the method of setting power for a reproducing beam to be applied to a magneto-optical disc to reproduce data therefrom, and the method of reproducing data from a magneto-optical disc, power optimal for the reproducing beam is obtained by curvilinear approximation based on the powers calculated by calibration performed at at least two points on the radius of the disc. The signal-recording layer of the disc can thereby be sufficiently heated even if the disc warps, causing coma aberration of the beam spot and de-focusing of the reproducing beam. Therefore, a stable MSR effect can be obtained.

In the method and apparatus according to the invention, power optimal for a reproducing beam to be applied at a position on a magneto-optical disc is obtained by curvilinear approximation based on the powers calculated by calibration performed at least two points on the radius of the disc. The signal-recording layer of the disc can thereby be sufficiently heated even if the disc warps, causing coma aberration of the beam spot and de-focusing of the reproducing beam. Therefore, a stable MSR effect can be obtained. Hence, the margin of power for the reproducing beam can be increased, whereby data can be reliably reproduced in the MSR mode from the magneto-optical disc, though the magnetic characteristic of the signal-recording layer greatly depends on temperature.

DETAILED DESCRIPTION OF THE INVENTION

An embodiment of the present invention will be described, with reference to the accompanying drawings. The embodiment is a magneto-optical disc 1 shown in FIG. 1 and FIGS. 2A and 2B, from which data may be reproduced by using the present invention.

The magneto-optical disc 1 is a recording medium on which data signals can be recorded in light modulation mode by means of a magneto-optical disc drive that will be described later. The data signals can be reproduced from the magneto-optical disc in magnetically induced super resolution (MSR) mode of CAD type. Nonetheless, the present invention is not limited to a magneto-optical disc from which data is reproduced in MSR mode of CAD type only. Rather, the invention can be applied to magneto-optical discs from which data is reproduced in any other type of MSR mode. For example, it can be applied to magneto-optical discs from which data is reproduced in MSR mode of RAD type.

Figure 1:
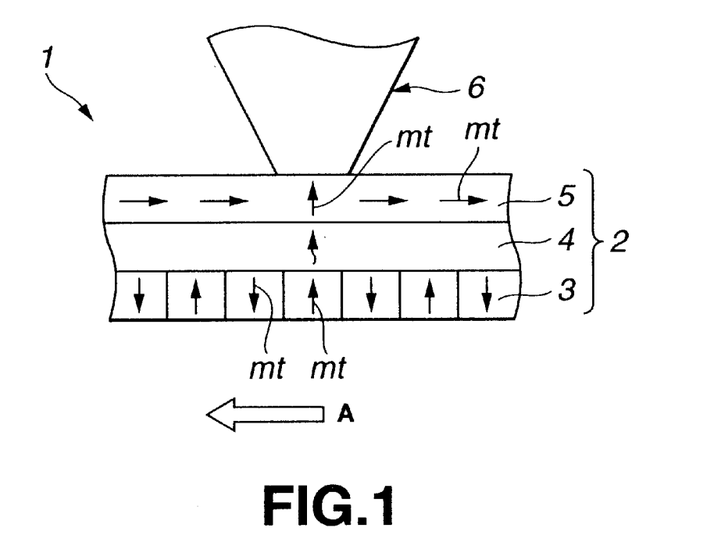
FIG. 1 is a sectional view of the magneto-optical disc from which data is reproduced by a method according to the present invention.

As shown in FIG. 1, the magneto-optical disc 1 comprises a disc substrate (not shown) and a signal recording layer 2 provided on the disc substrate. The signal-recording layer 2 is a thin, multi-layer film. It is composed of a first magnetic layer 3, a dielectric layer 4 and a second magnetic layer 5, which are laid one upon another in the order they are mentioned. A laser beam 6 may be applied to the second magnetic layer 5 to record data on or reproduce data from the magneto-optical disc 1.

Record marks Rb may be formed in the first magnetic layer 3. The marks Rb are magnetized in different directions mt in accordance with the data signals they represent. Thus, the first magnetic layer 3 functions as a data-holding layer. The second magnetic layer 5 functions as a data-reproducing layer. The magnetized directions mt of the record marks Rb formed on the first magnetic layer 3 are transferred to the second magnetic layer 5. Hence, the data signals can be read from the second magnetic layer 5. The first magnetic layer 3 and the second magnetic layer 5 each exhibits a magnetic characteristic that changes with temperature. The magnetic layers 3 and 5 therefore serve to achieve magnetically induced super resolution. The dielectric layer 4 is an intermediate layer that controls the magnetic coupling between the first magnetic layer 3 and the second magnetic layer 5.

To record a data signal on the magneto-optical disc 1, a bias magnetic field of a prescribed intensity is applied to the signal-recording layer 2. At the same time, a pulsating laser beam 6 modulated by the data signal is applied to the recording track Tr of the magneto-optical disc 1. Parts of the first magnetic layer 3 are irradiated with the laser beam 6 and thereby heated. These parts become record marks Rb, which are magnetized in the direction mt in which the bias magnetic filed is applied to the signal-recording layer 2.

Figure 2:
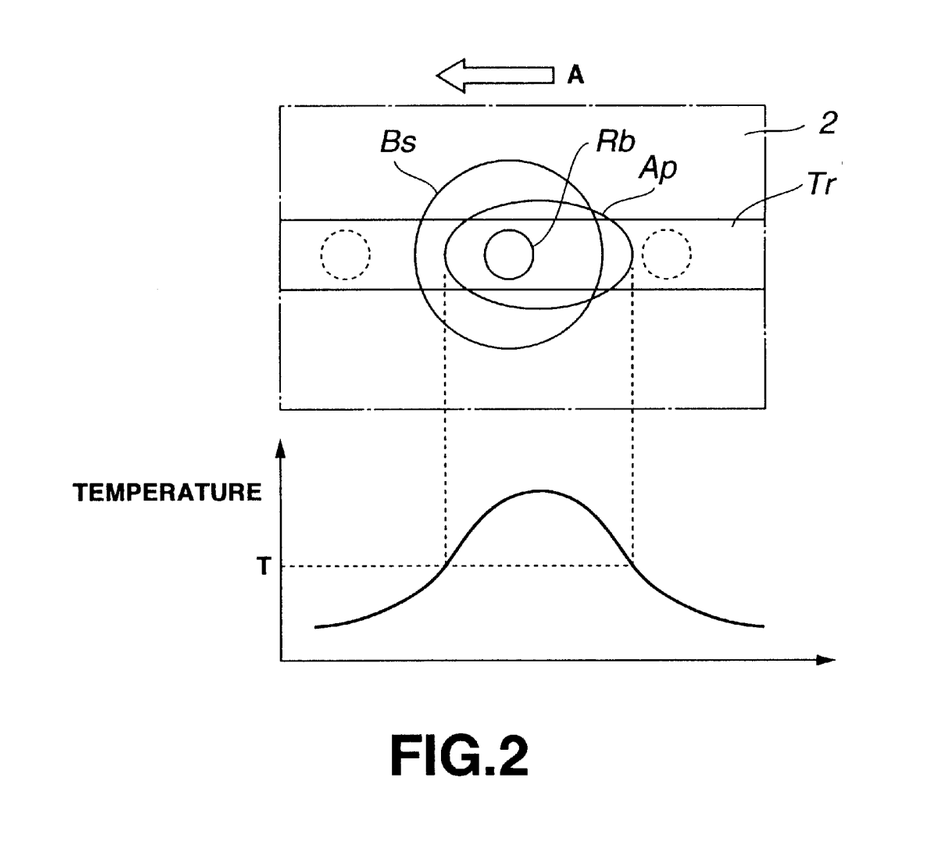
FIG. 2A is a plan view of a part of the magneto-optical disc, illustrating how a recording track is scanned with a laser beam.
FIG. 2B is a graph representing the temperature distribution that is observed in the signal recording track as the track is scanned with a laser beam.

To reproduce the data signal from the magneto-optical disc 1, as shown in FIG. 1 and FIGS. 2A and 2B, the beam 6 is less intense than the laser beam applied to record the data signal is applied to the recording track Tr of the disc 1. Any part of the signal-recording layer 2 that is irradiated with the light spot Bs the beam 6 forms on the layer 2 is heated to a prescribed temperature T. As a result, an aperture Ap is made in the second magnetic layer 5. The magnetized direction mt of that part of the first magnetic layer 3, which exists beneath the aperture AP, is transferred to the second magnetic layer 5. The direction mt, thus transferred to the second magnetic layer 5, is detected, whereby the data signal recorded in the form of the record mark Rb is reproduced from the magneto-optical disc 1.

FIG. 2A shows the recording track Tr of the magneto-optical disc 1 and the beam spot Bs the laser beam 6 forms on the signal-recording layer 2. FIG. 2B represents the temperature distribution in the signal-recording layer 2. The arrow A shown in FIG. 1 and FIG. 2B indicates the direction in which the laser beam 6 scans the magneto-optical disc 1.

As mentioned above, the data is reproduced from the magneto-optical disc 1 when the magnetized direction mt of that part of the first magnetic layer 3, which lies beneath the aperture Ap, is transferred from the first magnetic layer 3 to the second magnetic layer 5 and then is detected from the second magnetic layer 5. The diameter of the aperture Ap depends on the intensity of the laser beam 6. The area of any part of the second magnetic layer 5, to which the magnetized direction mt is transferred, can be therefore controlled by changing the intensity of the laser beam 6. Hence, a record marks Rb smaller than the beam spot Bs can be formed in the first magnetic layer 3, and the data defined by the record marks Rb can be reproduced from the magneto-optical disc 1.

Any aperture Ap formed in the second magnetic layer 5 is located at the center of the beam spot Bs the laser beam 6 forms on the signal-recording layer 2. Additionally, the magnetized direction mt is transferred from the first magnetic layer 3 to that part of the second magnetic layer 5 at which the aperture Ap is made therein. Thus, the magneto-optical disc 1 is known as one from which data can be reproduced in MSR mode of CAD (Center Aperture Detection) type.

A magneto-optical disc drive 10, which is another embodiment of the present invention and which is designed to reproduce data from the magneto-optical disc 1 described above, will be described with reference to FIG. 3. The magneto-optical disc drive 10 can not only reproduce data, but also record data on the magneto-optical disc 1.

Figure 3:
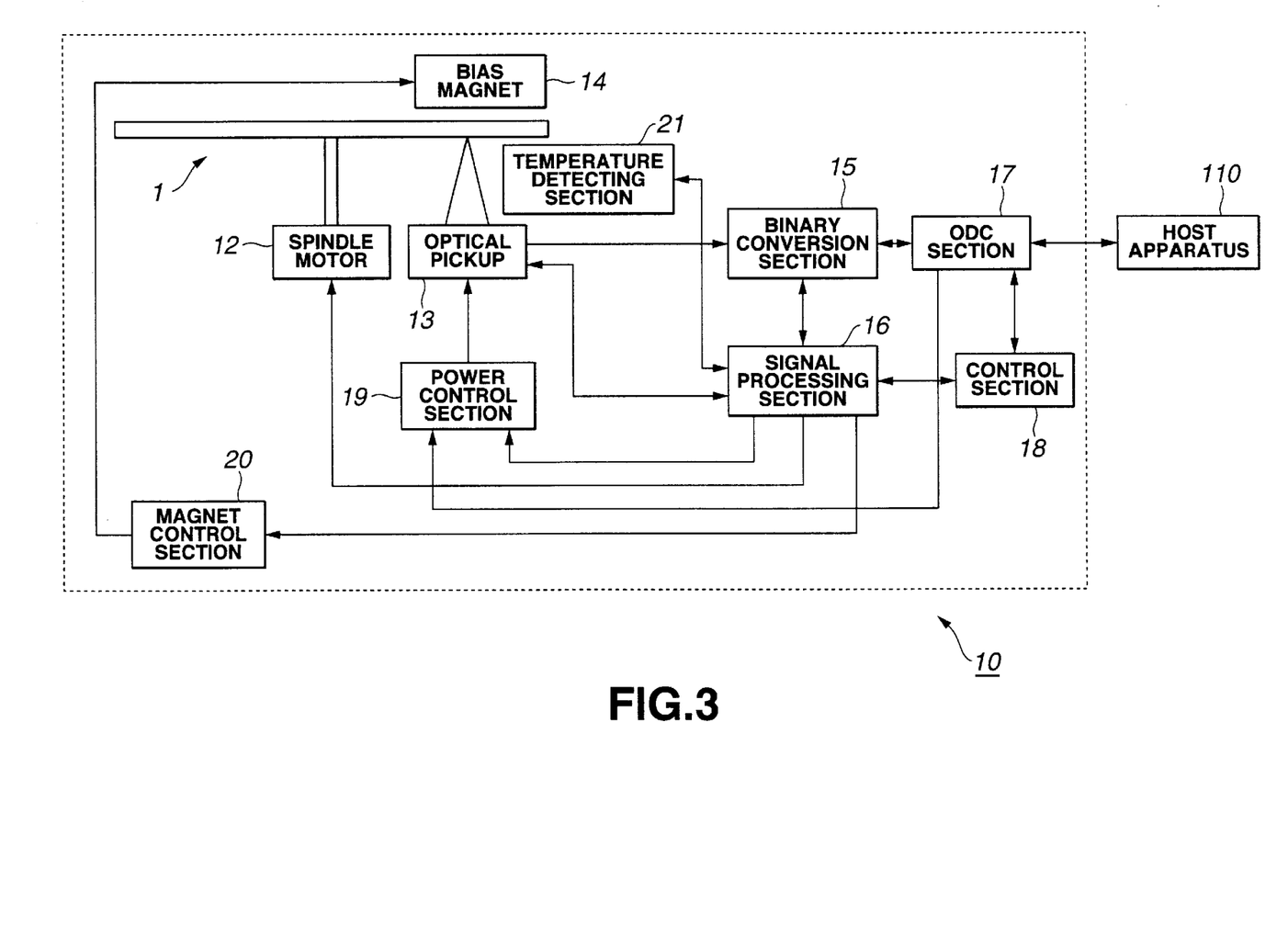
FIG. 3 is a block diagram of a magneto-optical disc drive that performs a data-reproducing method according to this invention.

As shown in FIG. 3, the magneto-optical disc drive 10 comprises a spindle motor 12, an optical pickup 13, a bias magnet 14, a binary conversion section 15, a signal processing section 16, an ODC (Optical Disc Controller) section 17, a control section 18, a power control section 19, a magnet control section 20, and a temperature detecting section 21. The spindle motor 12 rotates the magneto-optical disc 1 at a predetermined speed. The optical pickup 13 applies a laser beam to the magneto-optical disc 1. The bias magnet 14 applies a bias magnetic field of a prescribed intensity to the disc 1. The binary conversion section 15 converts signals read from the disc 1 into binary data. The signal processing section. 16 performs various processes on signals reproduced from the disc 1 and signals to be recorded on the disc 1. The ODC section 17 supplies and receives signals to and from a host apparatus 110 that is connected to the magneto-optical disc drive 10 and performs encoding/decoding of various signals. The control section 18 controls the other components of the disc drive 10. The power control section 19 controls the output of the optical pickup 13, i.e., the intensity of a laser beam the optical pickup 13 emits. The magnet control section 20 controls the intensity of the magnetic field the bias magnet 14 applies to the disc 1. The temperature detecting section 21 is provided to detect the temperature ambient to the optical pickup 13.

The optical pickup 13 comprises a light source (not shown) and a light detecting section (not shown, either). The light source is, for example, a laser diode and emits a laser beam. The laser beam is applied to the magneto-optical disc 1. The light detecting section detects the laser beam reflected from the disc 1. The light detecting section has, for example, a photodiode. The photodiode converts input light to a voltage signal by means of photoelectric conversion and current-to-voltage conversion. The voltage signal is supplied to the binary conversion section 15 and the power control section 19. The optical pickup 13 generates a focus-servo signal and a tracking-servo signal from the light detected by the light detecting section. The focus-servo signal shows how much the laser beam applied to the magneto-optical disc 1 is de-focused or de-tracked. The tracking-servo signal indicates how much the beam spot deviates from the recording track Tr. Both the focus-servo signal and the tracking-servo signal are supplied to the signal processing section 16.

The optical pickup 13 can be moved in the radial direction of the magneto-optical disc 1, when driven by a drive mechanism (not shown). Therefore, the optical pickup 13 can apply a laser beam to any.desired position on the disc 1.

The bias magnet 14 is positioned, opposing the optical pickup 3 across the magneto-optical disc 1. The magnet 14 applies a bias magnetic field of a preset intensity to the disc 1. The magnet control section 20 controls the bias magnetic field emanating from the magnet 14.

The binary conversion section 15 encodes a data signal to be recorded on the disc 1 or reproduced therefrom, into binary data that consists of "0s" and "1s." In the process of reproducing data from the disc 1, the section 15 performs binary conversion on the voltage signal the optical pickup 13 has generated from the light reflected from the disc 1. The binary data generated by the section 15 is input to the signal processing section 16 and the ODC section 17. In the process of recording data on the disc 1, the section 15 performs binary conversion on a signal supplied from the signal processing section 16. The output of the section 15 is input to the signal processing section 16.

The signal processing section 16 receives a focus-servo signal and a tracking-servo signal; both output from the optical pickup 13. In accordance with these servo signals, the section 16 controls the optical pickup 13, which focuses the laser beam and moves the beam spot to the centerline of the recording track Tr. The signal processing section 16 performs servo control on the spindle motor 12 and controls the drive mechanism that drives the optical pickup 13. Thus, the section 16 controls the rotational speed of the magneto-optical disc 1 and the position of the optical pickup 13.

The signal processing section 16 receives a temperature signal from the temperature detecting section 21, which has detected the temperature ambient to the optical pickup 13. Based on the temperature signal, the section 16 sets intensity for the bias magnetic field. The section 16 generates a signal that represents the intensity thus set. This signal is supplied to the magnet control section 20.

The ODC section 17 supplies and receive various signals to and from the host apparatus 110. The ODC section 17 encodes data signals to be recorded on the disc 1 and decode data signals reproduced from the disc 1. In response to a recording/reproducing request supplied from the host apparatus 110, the ODC section 17 switches the operating mode of the binary conversion section 15 and generates a clock signal. The clock signal is supplied to the control section 18, which controls the power control section 19. From the clock signal the power control section 19 generates a data-recording pulse signal, which is supplied to the optical pickup 13. The optical pickup 13 emits a laser beam that pulsates in accordance with the data-recording pulse signal.

As shown in FIG. 3, the control section 18 is connected to the other components of the magneto-optical disc drive 10, either directly or indirectly, for controlling them. This means that the control section 18 is the main controller in the magneto-optical disc drive 10. The section 18 comprises semiconductor chips such as a CPU (Central Processing Unit), a RAM (Random Access Memory), a ROM (Read Only Memory) and the like. The CPU executes the program stored in, for example, the ROM, so that the section 19 may control the other components of the magneto-optical disc drive 10.

The power control section 19 controls the intense of the laser beam the optical pickup 13 applies to the magneto-optical disc 1. The section 19 controls the optical pickup 13, which emits a laser beam having intensity that is optimal in view of the type and characteristic of the disc 1 and the operating mode of the drive 10, i.e., data-recording mode, data-reproducing mode or initial operating mode.

The magnet control section 20 receives a signal supplied from the signal processing section 16. In accordance with this signal the section 20 controls the intensity of the magnetic field emanating from the bias magnet 14.

The magneto-optical disc drive 10 can record and reproduce data on and from not only the magneto-optical disc 1, but also any other type of an optical disc. When the drive 10 is used to record data on or reproduce data from an optical disc of another type, it is desired that the magnet control section 20 should prohibit the bias magnet 14 from generating a magnetic field. In this case, the power consumption decreases in the magneto-optical disc drive 10.

Thus, the bias magnet 14 must be controlled in accordance with which type of an optical disc is used, i.e., the disc 1 from which data is reproduced in MSR mode of CAD, or an optical disc of any other type. The magneto-optical disc 1 can be distinguished from an optical disc of any other type, by using the information recorded in the ROM region (also known as "PEP zone," or phase encoded part zone) provided on the innermost or outermost track of the disc. In other words, the disc can be identified in terms of its type, in accordance with the optimal intensity for the laser beam and the specification of the disc, which are recorded in the ROM region of the disc. Either the signal processing section 16 or the control section 18 can determine the type the disc set in the magneto-optical disc drive 10. The magnet control section 20 can be controlled in accordance with the type of the disc, determined by the section 16 or 18.

The temperature detecting section 21 comprises, for example, a thermistor. It detects the temperature ambient to the magneto-optical disc 1 and generates a temperature signal representing the temperature. The temperature signal is input to the signal processing section 16. It is desirable to arrange the temperature detecting section 21 near the position at which the laser beam emitted from the optical pickup 13 irradiates the disc 1. For example, the section 21 may be formed integral with the optical pickup 13. If so, the section 21 can correctly detect the temperature, scarcely influenced by the temperature distribution in the disc drive 10, at said position where data is actually recorded on or reproduced from the disc 1.

To record data on or reproduce data from the magneto-optical disc 1 in the magneto-optical disc drive 10, the disc 1 is coupled at its center to the spindle motor 12 and the spindle motor 12 is driven at a constant angular velocity (CAV).

Supported at its center, the magneto-optical disc 1 warps due to its own weight, assuming a shape like a bowl. In other words, the disc inclines more at a track than at any inner track. The signal-recording layer inclines to the laser beam applied to the disc, at an increasing angle toward the outermost recording track. The spot the laser beam forms on the signal-recording layer inevitably has coma aberration. Moreover, the laser beam emitted the optical pickup 13 is de-focused on most recording track, because the disc 1 warps.

Due to the coma aberration of the beam spot and the de-focusing of the laser beam, no sufficient temperature rise can take place at those parts of the signal-recording layer 2, which have been irradiated with the laser beam because of the change of the heat distribution at the spot position of the signal-recording layer 2 of the magneto-optical disc 1. This makes it impossible to attain high or stable MSR effect.

Figure 4:
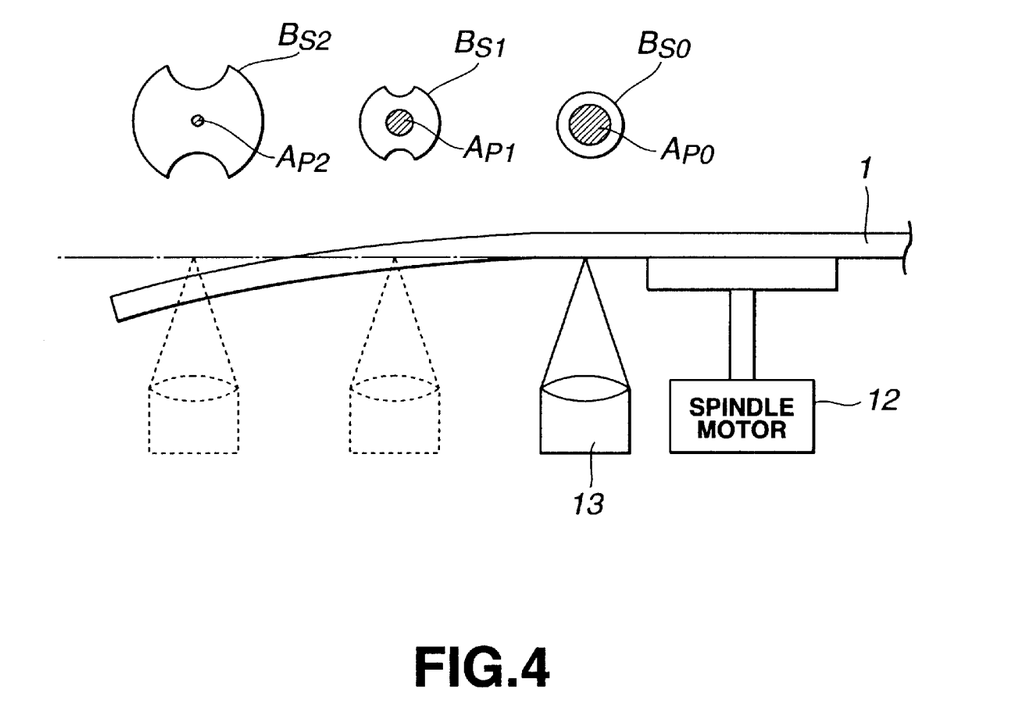
FIG. 4 is a diagram showing the warping of the magneto-optical disc from which data is reproduced by the method according to the invention.

If the laser beam is appropriately applied to the disc 1, an aperture $Ap_0$ is formed within the beam spot $Bs_0$ as is illustrated in FIG. 4. On an outer track of the magneto-optical disc 1, however, the coma aberration of the beam spot is prominent and the de-focusing of the beam is great. The beam spot changes in shape and increases in diameter to one $Bs_1$ or $Bs_2$, both shown in FIG. 4. The heat applied to the disc 1 disperses, and only a limited region can be heated to the prescribed temperature T (FIG. 2B). Consequently, the apertures $Ap_1$ and $Ap_2$ formed within the beam spots $Bs_1$ and $Bs_2$, respectively, are smaller than is desired.

Hence, the signal-recording layer 2 cannot be adequately heated if the intensity of the reproducing laser beam is increased with only the linear velocity of the disc 1 that increases as the optical head 13 moves toward the outermost track, as in the case of reproducing data from the conventional magneto-optical disc. Inevitably, the margin for the intensity of the reproducing laser beam decreases, possibly diminishing the magnetic characteristics of the signal-recording layer 2. Unless the aperture is sufficiently large, the signal reproduced is deteriorated. Therefore, it may become difficult to achieve reliable reproduction of data.

Figure 5:
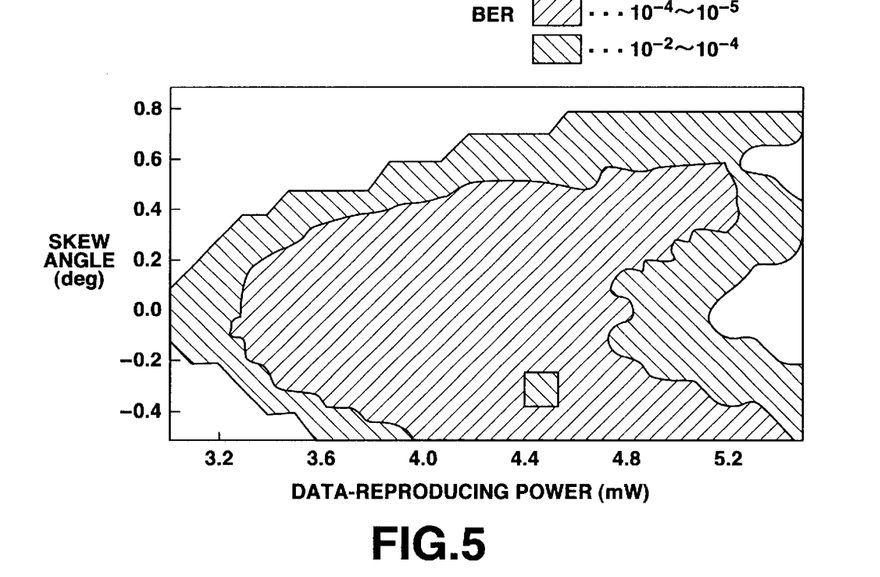
FIG. 5 is a graph illustrating the relation between the intensity of a reproducing beam applied to the magneto-optical disc, the skew angle of the disc and the byte error rate (BER)

To prove this true, the inventors hereof conducted an experiment. In the experiment, the intensity of the reproducing laser beam and the angle at which the disc 1 inclines to the plane perpendicular to the laser beam were changed to various values. The byte error rate (BER) of the signal reproduced in each case wherein the intensity and the angle (i.e., skew angle) were set at a specific value each. FIG. 5 shows the result of the experiment. In addition, the amplitude of the signal reproduced in each case was measured, too. The result was as shown in FIG. 6.

As is evident from FIG. 5, the greater the skew angle, the higher the BER, provided that the intensity of the reproducing laser beam applied to a specific track remains constant. As can be seen from FIG. 6, the greater the skew angle, the smaller the amplitude of the signal reproduced. Thus, it can be confirmed that the coma aberration of the beam spot and the de-focusing of the reproducing laser beam more deteriorate the signal as the skew angle increases due to the warping of the disc 1.

As can be understood from FIG. 5, a maximum margin can be set for the intensity of the reproducing beam to reduce the byte error rate (BER) when the skew angle is 0°. The greater the skew angle, the narrower the intensity margin. Thus, the intensity of the reproducing beam must be raised in order to lower the BER. As is seen from FIG. 6, too, the beam intensity must be raised as the skew angle increases, in order to reproduce a signal that has a sufficient amplitude.

Figure 6:
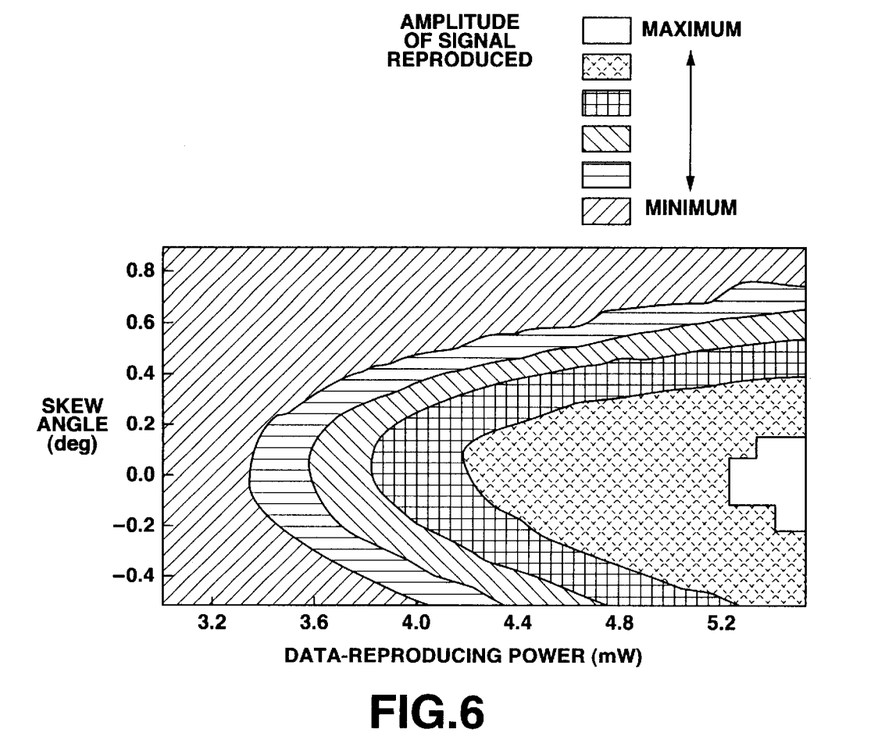
FIG. 6 is a graph showing the relation between the intensity of a reproducing beam applied to the magneto-optical disc, the skew angle of the disc and the amplitude of a signal reproduced.
Figure 7:
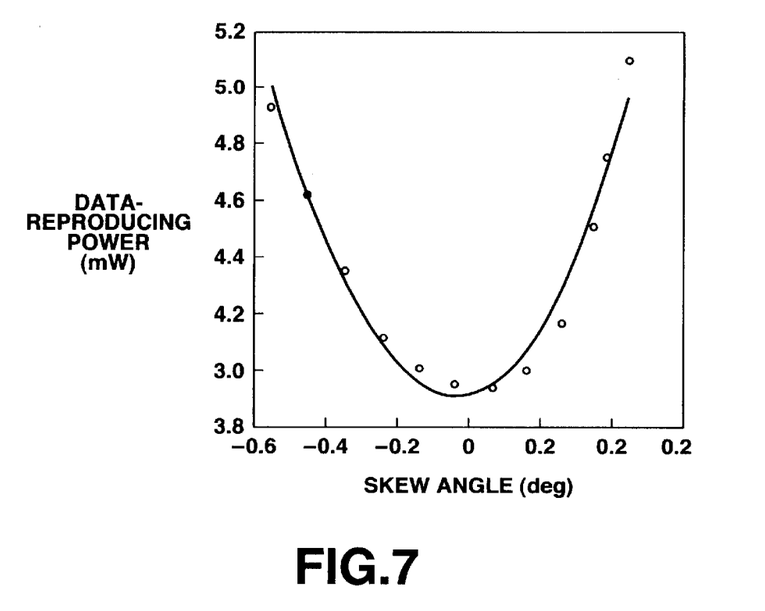
FIG. 7 is a graph representing the relation between the intensity of a reproducing beam applied to the magneto-optical disc and the skew angle of the disc.

FIG. 7 is a graph representing the relation between the skew angle of the disc 1 and the optimal intensity for a reproducing beam that has been obtained from the results shown in FIGS. 5 and 6. In FIG. 7, the quadratic curve indicates the relation approximated. As is seen from FIG. 7, too, it is necessary to enhance the intensity of the reproducing beam as the skew angle increases, if the laser beam emitted from the optical pickup 13 irradiates the same position on the magneto-optical disc 1.

In the present invention, the intensity of the reproducing beam is set in accordance with not only the linear velocity of the disc 1, but also the coma aberration of the beam spot and the de-focusing of the reproducing laser beam. (As indicated above, the linear velocity changes as the optical head 13 moves in the radial direction of the disc 1 and the coma aberration and de-focusing result from the warping of the disc 1.) Therefore, stable and reliable reproduction of data can be accomplished.

To set the intensity of the reproducing laser beam, calibration is carried out for at least two points on the radius of the magneto-optical disc 1. Optimal intensities for these points are calculated. From the optimal intensities thus calculated, the intensity of the reproducing beam is calculated by approximation and set for a given position on the radius of the magneto-optical disc 1.

Figure 8:
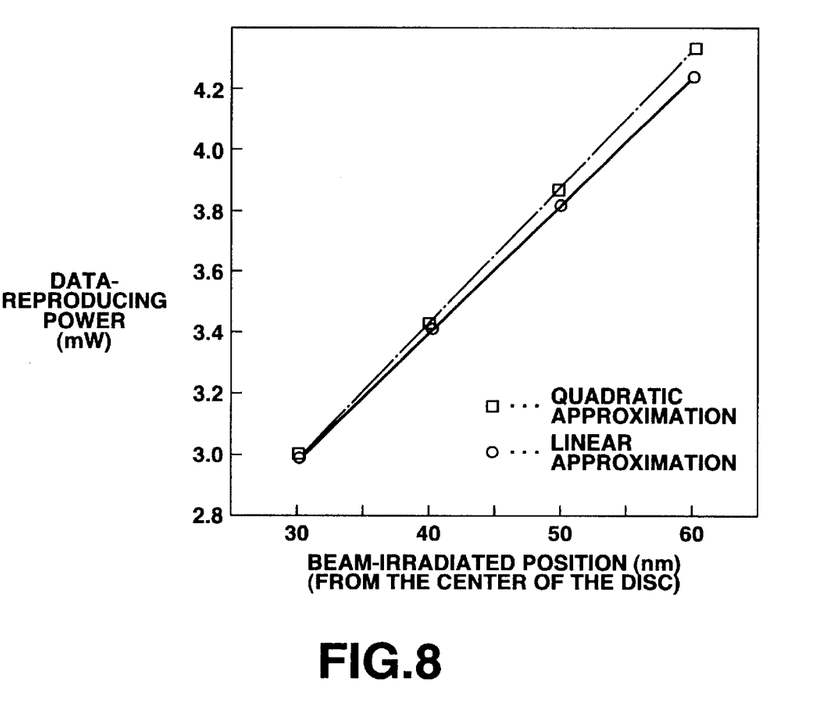
FIG. 8 is a graph illustrating the relation between the intensity of a reproducing beam applied to the magneto-optical disc and the position where the beam is applied to the disc.

In the conventional method, the intensity of the reproducing beam is increased in proportion to the linear velocity of the disc 1, which increases as the optical head 13 moves toward the outermost track of the disc 1. The solid line in FIG. 8 illustrates the relation between the intensity of the reproducing beam applied and the position where the beam is applied to a magneto-optical disc 1, which has a diameter of 5.25 inches and a user area whose inner and outer diameters are 30 mm and 60 mm, respectively. Calibration is carried out at only the innermost track of this disc 1, thereby finding an optimal intensity for the reproducing laser beam. The intensity of the beam is linearly increased, from the value obtained for the innermost track to the value for the outermost track, which is 2½ times as high, or about 1.4 times as high.

In the present invention, the intensity of the reproducing beam can be increased at a higher rate as is indicated by the one-dot dashed line in FIG. 8, as the optical head 13 moves toward the outermost track of the disc 1. That is, the intensity is increased in consideration of the warping of the magneto-optical disc 1, by the value that corresponds to the distance between the solid line and the one-dot dashed line. The difference between the value the solid line and that of one-dot dashed line increases toward the outermost track of the magneto-optical disc 1. This is because the disc 1 warps more at a track than at any inner track.

The one-dot dashed line in FIG. 8 shows the relation between the intensity of the reproducing beam and the position at which the beam irradiates the disc 1. This relation corresponds to the quadratic curve of FIG. 7. Nevertheless, the present invention is limited to the intensity-position relation illustrated in FIG. 8. Rather, it suffices to set intensity for the reproducing beam by approximation based on curves of higher orders or various functions. It is preferable, however, to set the intensity of the reproducing beam in accordance with the quadratic curve. If set based on the quadratic curve, the intensity of the producing beam will best accords with the physical property of the disc warping. In the instance shown in FIG. 8, the disc 1 has a skew angle of 1.5° at the outermost track.

In the present invention, the reproducing laser beam is gradually intensified as the optical head 13 moves toward the outermost track of the disc 1, at a rate higher than the linear velocity of the disc 1. This prevents the aperture Ap from becoming smaller as shown in FIG. 4, regardless of the coma aberration of the beam spot and the de-focusing of the reproducing laser beam, both resulting from the warping of the disc 1. Thus, the signal-recording layer 2 can be adequately to accomplish a stable MSR effect.

In this invention it is desired that calibration be conducted at two positions on the magneto-optical disc 1, more precisely at the innermost track and the outermost track. This method provides the best intensity for the reproducing beam to be applied to the innermost track and the best intensity for the beam to be applied to the outermost track. In this regard it should be noted that the disc 1 least and most warps at the innermost track and the outermost track, respectively. It should also be noted that signals of the lowest byte error rate are reproduced from the innermost track and signals of the highest byte error rate are reproduced from the outermost track. Hence, the present invention can minimize the byte error rate because the intensity of the producing beam is set based on the quadratic curve.

It is desired that calibration be effected at an intermediate track on the magneto-optical disc 1, obtaining the beam intensity optimal for reproducing data from the intermediate track. Curvilinear approximation should be performed based on the beam intensities best for the innermost track, intermediate track and outermost track. The coefficients of an approximate curve can then be correctly obtained. The intensity, which best for the reproducing beam in view of the warping of the disc 1, can thereby set with high accuracy.

As a result of having effected the calibration, the intensity for the reproducing beam may be set by means of linear approximation likely to the conventional method when the warps is a little, whereas setting the intensity for the reproducing beam by means of curvilinear approximation only when the warps of the magnet-optical disc 1 is much.

More specifically, calibration is first carried out in a radial direction at the innermost track and outermost track of the magneto-optical disc 1, thereby finding the best intensity the reproducing beam should have when applied to the innermost track and the outermost track, respectively. Then, a line is obtained, which inclines at an angle that corresponds to the slope (i.e., $2^{A;2}$) defined by the difference in linear velocity between the innermost track and the outermost track. Further, an optimal intensity the reproducing beam must have when applied at a given position on the disc 1 is calculated by curvilinear approximation, only if the difference between the intensity obtained and the prescribed intensity exceeds a predetermined value. If this difference does not exceed the predetermined value, the optimal intensity for the reproducing beam is calculated by means of linear approximation.

In other words, it suffices to set the intensity of the reproducing beam by the conventional simple method if the disc 1 warps but a little and for the coma aberration of the beam spot and the de-focusing of the laser beam are not so prominent. Then, it is possible to shorten the time that is required to set an optimal intensity of the reproducing beam.

The data representing the intensity thus set for the reproducing beam is stored into the rewritable memory element incorporated in the signal processing section 16 of the magneto-optical disc drive 10. The data may be read from the memory element, whenever necessary. The power determined from the data is supplied to the optical pickup 13, which applies a reproducing laser beam of the intensity represented by that data, to the magneto-optical disc 1.

It suffices for the data representing the optimal intensity set for the reproducing beam to be stored into the memory element, in association with the position (on the radius) where the laser beam irradiates the disc 1. The data may be stored in the form of a function of the position. Alternatively, only the coefficient of the quadratic curve may be stored into the memory element. Still alternatively, a table of various positions on the radius of the disc 1 and the corresponding intensities for the reproducing beam may be stored into the memory element. The method of controlling the intensity of the reproducing beam need not be limited to continuous adjusting of the intensity in accordance with the position (on the radius) at which the beam irradiates the disc 1. Rather, the intensity may be controlled step by step, in accordance with the position (on the radius) at which the beam irradiates the disc 1.

Figure 9:
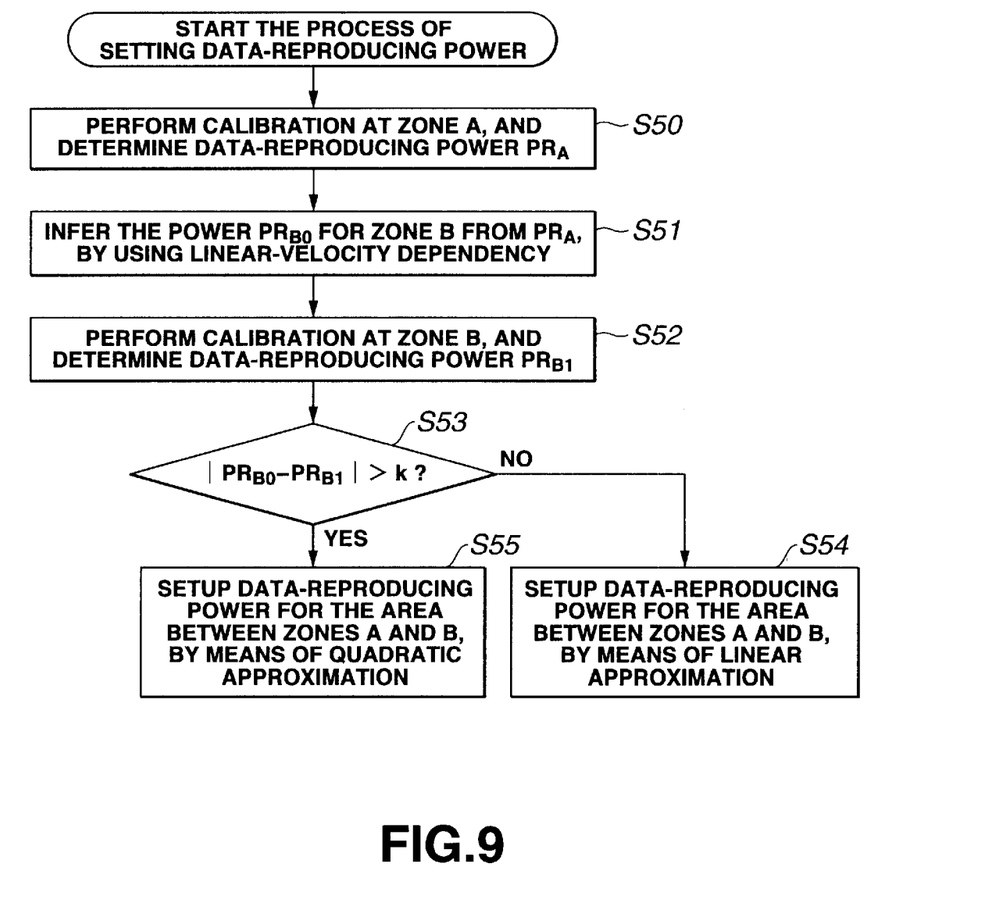
FIG. 9 is a flowchart explaining a method of setting intensity for the reproducing beam, according to the present invention.

A method of setting intensity for the reproducing beam in the present invention will be explained, with reference to the flowchart of FIG. 9. Assume that the magneto-optical disc 1 has already been set in place in the magneto-optical disc drive 10.

Figure 10:
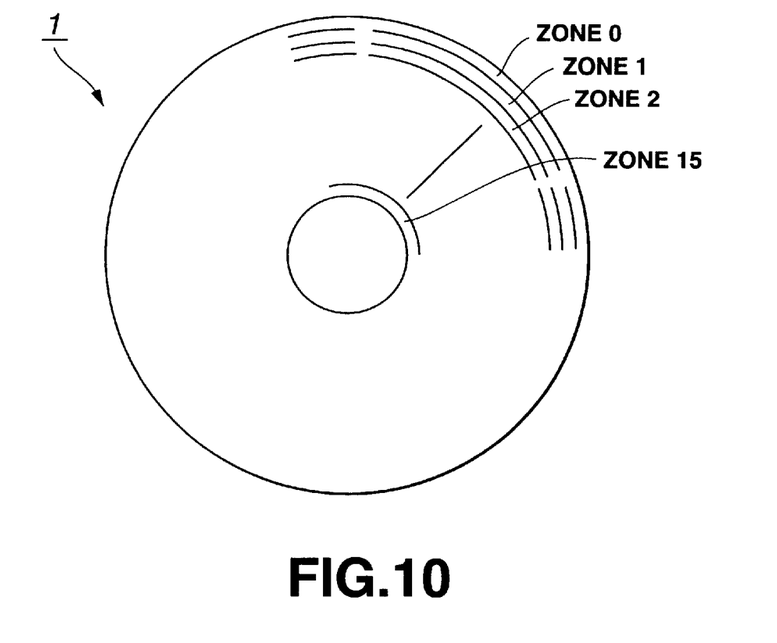
FIG. 10 is a plan view of a magneto-optical disc, showing signal-recording areas provided on the disc.

In Step S50, calibration is performed at a zone A, i.e., a prescribed position on the radius of the magneto-optical disc 1. The power $PR_A$ at which the reproducing beam should be applied to the zone A is thereby determined. Note that the word "zone" used here means any one of concentric annular zones that constitute the signal-recording area of the disc 1, as may be understood from FIG. 10. The signal-recording area consists of 16 zones, i.e., zones 0 to 15. The zone 0 is the outermost, whereas the zone 15 the innermost.

The calibration may well be performed in Step S50 at any zone near the outer circumference of the disc 1. Nonetheless, it is desirable to carry out the calibration at the outermost zone 0, in order to set the best possible intensity for the reproducing beam.

Figure 11:
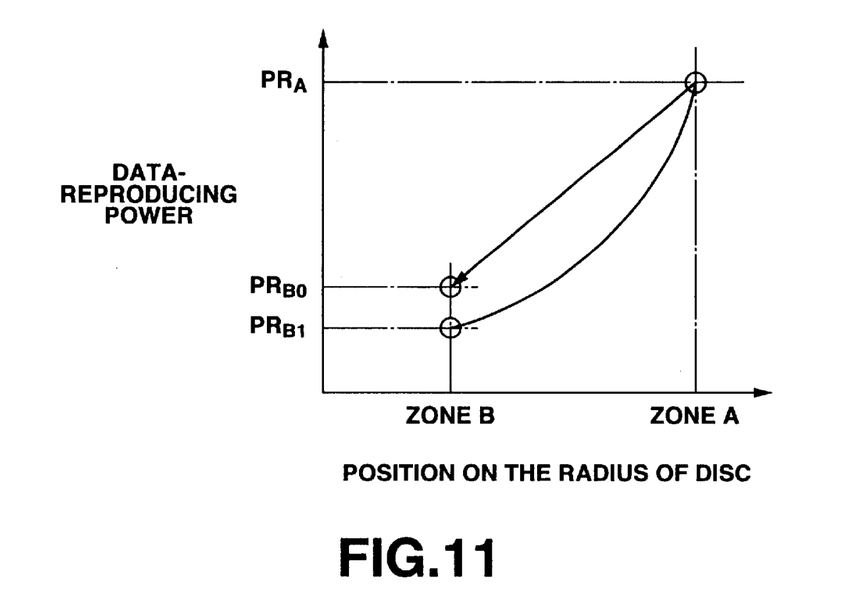
FIG. 11 is a graph explaining how to set intensity for the reproducing beam in the present invention.

Then, in Step S51, power $PR_{B0}$ optimal for zone B that is inner with respect to the zone A is inferred from the power $PR_A$ obtained in Step S50, taking into account the linear velocity the disc 1 has at the zone B. It is assumed that, as shown in FIG. 11, the linear velocity at the outermost zone 0 of the disc 1 is $2^{A;2}$ times as high as the linear velocity at the innermost zone 15. In this case, the power $PR_{B0}$ optimal for the zone B is inferred by the use of a line having a slope of $2^{A;2}$.

In Step S51, the given position may be the zone B if it is inner with respect to the zone A of Step S50. Nonetheless, to set the best intensity for the reproducing beam, it is desired that calibration be performed at the innermost zone 15, so that the power inferred in Step S51 may be compared with the power determined in Step S52 with high accuracy.

In Step S52, calibration is performed at the zone B, thereby determining the power $PR_{B1}$ that is actually optimal for the zone B.

In Step S53, the power $PR_{B0}$ inferred in Step S51 is compared with the power $PR_{B1}$ determined in Step S52. If the difference between the power $PR_{B0}$ and the power $PR_{B1}$ does not exceed a predetermined value k, the operation goes to Step S54. If the difference exceeds the predetermined value k, the operation jumps to Step S55.

In Step S53, the data-reproducing power for the area between zones A and B is obtained by approximation using a straight line. To be more specific, the line connecting power $PR_A$ and power $PR_{B0}$ or the line connecting power $PR_A$ and power $PR_{B1}$ is applied, thereby finding the data-reproducing power for the area between zones A and B.

In Step S54, the data-reproducing power for the area between zones A and B is obtained by approximation using a curve. That is, power $PR_A$ and power $PR_{B1}$ are substituted in a quadratic function, thereby calculating the coefficient of the quadratic function. Using the quadratic curve thus obtained, the data-reproducing power for the area between zones A and B, as is illustrated in FIG. 11.

The data showing the optimal power set in Step S54 or Step S55 for the reproducing beam to be applied to a given position on the radius of the disc 1 is stored into the memory element incorporated in the signal processing section 16 of the magneto-optical disc drive 10. To reproduce data from the disc 1, the data is read from the memory element, and a laser beam of the intensity corresponding to the optimal power represented by the data is applied to the magneto-optical disc 1. The data is thereby reproduced from the magneto-optical disc 1.

What is claimed is:

1. A method of setting power for a reproducing beam to be applied to a magneto-optical disc to reproduce data therefrom in magnetically induced super resolution mode, while the disc is rotating at a constant angular velocity, said method comprising:

a first calibration step of performing calibration on a signal-recording region of the magneto-optical disc, at least two positions on a radius of the magneto-optical disc, thereby to calculate optimal data-reproducing powers for said at least two positions; and a second calibration step of setting a data-reproducing power optimal for a given position on the radius of the magneto-optical disc, by performing curvilinear approximation on the data-reproducing powers calculated in the first calibration step.

2. The method according to claim 1, wherein a quadratic curve is applied to the curvilinear approximation performed in the second calibration step, in order to set the data-reproducing power optimal for a given position on the radius of the magneto-optical disc.

3. The method according to claim 1, wherein three optimal data-reproducing powers are calculated in the first calibration step, for the innermost position, an intermediate position and the outermost position on the radius of the magneto-optical disc, respectively.

4. The method according to claim 1, wherein data-reproducing three powers optimal for the innermost position, an intermediate position and the outermost position on the radius of the magneto-optical disc are calculated in the first calibration step; and in the second calibration step, the data-reproducing power optimal for a given position on the radius of the magneto-optical disc is obtained by curvilinear approximation when the difference between a line having a slop corresponding to a linear velocity of the disc and the optimal data-reproducing power calculated exceeds a predetermined value, and by linear approximation when said difference does not exceed the predetermined value.

5. A method of reproducing data from a magneto-optical disc, while the disc is rotating at a constant angular velocity, said method comprising:

a first calibration step of performing calibration on a signal-recording region of the magneto-optical disc, at at least two positions on a radius of the magneto-optical disc, thereby to calculate optimal data-reproducing powers for said at least two positions;

a second calibration step of setting a data-reproducing power optimal for a given position on the radius of the magneto-optical disc, by performing curvilinear approximation on the data-reproducing powers calculated in the first calibration step; and a data-reproducing step of applying a laser beam to the magneto-optical disc, thereby to reproduce data signals from the disc, said laser beam having intensity that corresponds to the data-reproducing power set in the second calibration step.

6. The method according to claim 5, wherein a quadratic curve is applied to the curvilinear approximation performed in the second calibration step, in order to set the data-reproducing power optimal for a given position on the radius of the magneto-optical disc.

7. The method according to claim 5, wherein three optimal data-reproducing powers are calculated in the first calibration step, for the innermost position, in intermediate position and the outermost position on the radius of the magneto-optical disc, respectively.

8. The method according to claim 5, wherein data-reproducing three powers optimal for the innermost position, an intermediate position and the outermost position on the radius of the magneto-optical disc are calculated in the first calibration step; and in the second calibration step, the data-reproducing power optimal for a given position on the radius of the magneto-optical disc is obtained by curvilinear approximation when the difference between a line having a slop corresponding to a linear velocity of the disc and the optimal data-reproducing power calculated exceeds a predetermined value, and by linear approximation when said difference does not exceed the predetermined value.

* * * * *